(12) United States Patent
Susitaival et al.

(10) Patent No.: US 8,964,539 B2
(45) Date of Patent: Feb. 24, 2015

(54) ACTIVE QUEUE MANAGEMENT FOR WIRELESS COMMUNICATION NETWORK UPLINK

(75) Inventors: Riikka Susitaival, Helsinki (FI); Yifeng Tan, Espoo (FI); Per Johan Torsner, Masaby (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 162 days.

(21) Appl. No.: 13/257,631

(22) PCT Filed: Jul. 1, 2009

(86) PCT No.: PCT/SE2009/050851
§ 371 (c)(1),
(2), (4) Date: Oct. 27, 2011

(87) PCT Pub. No.: WO2010/107355
PCT Pub. Date: Sep. 23, 2010

(65) Prior Publication Data
US 2012/0039169 A1    Feb. 16, 2012

Related U.S. Application Data

(60) Provisional application No. 61/161,972, filed on Mar. 20, 2009.

(51) Int. Cl.
*G01R 31/08* (2006.01)
*H04L 12/28* (2006.01)
(Continued)

(52) U.S. Cl.
CPC .............. *H04L 69/16* (2013.01); *H04L 47/10* (2013.01); *H04L 47/12* (2013.01); *H04L 47/14* (2013.01);
(Continued)

(58) Field of Classification Search
None
See application file for complete search history.

(56) References Cited

U.S. PATENT DOCUMENTS 6,901,593 B2 *   5/2005   Aweya et al. ................. 718/104
7,701,852 B1 *   4/2010   Hohn et al. .................... 370/232
(Continued)

FOREIGN PATENT DOCUMENTS

CN   101047640 A   10/2007
RU   2329607 C2   7/2008
(Continued)

OTHER PUBLICATIONS

3rd Generation Parntership Project. "Specifying SDU Discard Function for the UE." 3GPP TSG-RAN WG2 #60, Tdoc R2-074703, Jeju, Korea, Nov. 5-9, 2007.
(Continued)

*Primary Examiner* — Hassan Phillips
*Assistant Examiner* — Hicham Foud
(74) *Attorney, Agent, or Firm* — Coats & Bennett, P.L.L.C.

(57) ABSTRACT

According to the teachings presented herein, a base station implements active queue management (AQM) for uplink transmissions from user equipment (UE), such as a mobile terminal. The base station, e.g., an eNodeB in a Long Term Evolution (LTE) network, uses buffer status reports, for example, to estimate packet delays for packets in the UE's uplink transmit buffer. In one embodiment, a (base station) method of AQM for the uplink includes estimating at least one of a transmit buffer size and a transmit buffer queuing delay for a UE, and selectively dropping or congestion-marking packets received at the base station from the UE. The selective dropping or marking is based on the estimated transmit buffer size and/or the estimated transmit buffer queuing delay.

18 Claims, 4 Drawing Sheets

(51) Int. Cl.

| | | |
|---|---|---|
| *H04L 29/06* | (2006.01) | |
| *H04L 12/801* | (2013.01) | |
| *H04L 12/835* | (2013.01) | |
| *H04L 12/833* | (2013.01) | |
| *H04L 12/823* | (2013.01) | |
| *H04W 28/12* | (2009.01) | |
| *H04W 80/06* | (2009.01) | |

(52) U.S. Cl.
CPC ............... *H04L 47/30* (2013.01); *H04L 47/31* (2013.01); *H04L 47/32* (2013.01); *H04W 28/12* (2013.01); *H04L 69/163* (2013.01); *H04W 80/06* (2013.01)
USPC ........................... 370/230; 370/235; 370/412

(56) References Cited

U.S. PATENT DOCUMENTS

| | | | |
|---|---|---|---|
| 7,769,926 B2 * | 8/2010 | Wu et al. ................. | 710/56 |
| 7,792,130 B2 * | 9/2010 | Fischer .................... | 370/412 |
| 8,107,369 B2 * | 1/2012 | Sagfors .................... | 370/230 |
| 8,233,453 B2 * | 7/2012 | Ohta et al. ............... | 370/331 |
| 8,248,941 B2 * | 8/2012 | Teyeb et al. ............. | 370/235 |
| 8,363,625 B2 * | 1/2013 | Yeo et al. ................ | 370/336 |
| 8,385,196 B2 * | 2/2013 | Wang et al. ............. | 370/230 |
| 2003/0088690 A1 * | 5/2003 | Zuckerman et al. ..... | 709/232 |
| 2004/0218617 A1 * | 11/2004 | Sagfors .................... | 370/412 |
| 2005/0047344 A1 * | 3/2005 | Seol ......................... | 370/235 |
| 2005/0111361 A1 | 5/2005 | Hosein | |
| 2007/0258365 A1 * | 11/2007 | Das et al. ................ | 370/230 |
| 2008/0186918 A1 | 8/2008 | Tinnakornsrisuphap et al. | |
| 2009/0180384 A1 * | 7/2009 | Ansari et al. ............ | 370/235 |
| 2010/0309788 A1 * | 12/2010 | Ho et al. ................. | 370/236 |
| 2012/0147750 A1 * | 6/2012 | Pelletier et al. .......... | 370/235 |
| 2012/0294151 A1 * | 11/2012 | Ohta et al. ............... | 370/236 |
| 2012/0294284 A1 * | 11/2012 | Ohta et al. ............... | 370/331 |

FOREIGN PATENT DOCUMENTS

| | | |
|---|---|---|
| WO | 02082747 A2 | 10/2002 |
| WO | 2005064862 A1 | 7/2005 |

OTHER PUBLICATIONS

3rd Generation Parntership Project. "SDU Discard." 3GPP TGS-RAN WG2 #60, Tdoc R2-074689, Jeju, Korea, Nov. 5-9, 2007.

Ericsson, "On the Need for Active Queue Management for non-GBR Bearers", TSG-RAN WG2 Meeting #60bis, Feb. 11-15, 2008, Sorrento, Italy, R2-080937.

3rd Generation Partnership Project, "Technical Specification Group Radio Access Network; Evolved Universal Terrestrial Radio Access (E-UTRA) Medium Access Control (MAC) protocol specification (Release 8)", May 2008, 3GPP TS 36.321 V8.2.0.

Sagfors, M. et al., "Buffer Management for Rate-Varying 3G Wireless Links Supporting TCP Traffic", IEEE, 2003, pp. 675-679.

* cited by examiner

Algorithm 1: Delay-Based AQM in eNodeB if *(bsrSize < lowerDropThreshold)*
    *deliver packet* else if *(estimated_delay > minAgeThreshold AND currentTime − lastDropTime > minInterDropTime )*
    *drop packet*
    *lastDropTime ← now* else
    *deliver packet*

Algorithm 2: packet delay estimation
*initial Array D[]*
*initial Array R[]*
$Q\_old \leftarrow 0$
*Each time the queue length Q is monitored and also L and $\Delta t$ available:*
  if (Q = 0)
    *initialize R[] and D[]*
    $Q\_old \leftarrow 0$
  else
    *delay = 0*
    $newData = Q + L - Q\_old$
    for (j ← length(D[]) to 1)
      if (R[j] > Q - newData)
        *delay ← D[j]*
        *remove element j from R[] and D[]*
      else
        if (R[j] + newData < 0)
          *remove element j from R[] and D[]*
        else
          $R[j] \leftarrow R[j] + newData$
          $D[j] \leftarrow D[j] + \Delta t$
    *estimatedDelay ← (delay + D[].lastElement)/2*
    $Q\_old \leftarrow Q$
    *R[].addFirst(0)*
    *R[].addLast(Q)*
    *D[].addFirst(0)*
    *D[].addLast(estimatedDelay)*

FIG. 3

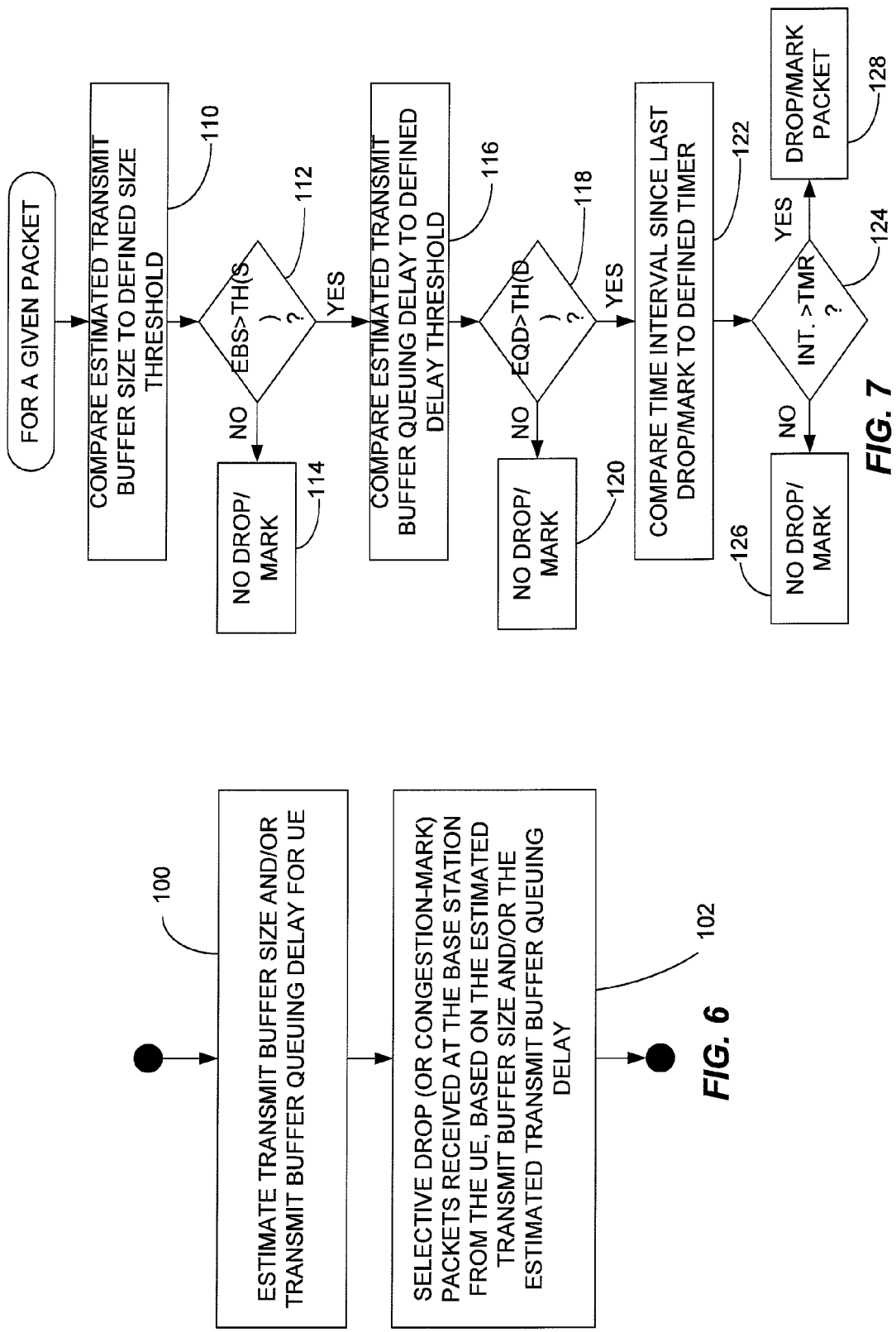

ACTIVE QUEUE MANAGEMENT FOR WIRELESS COMMUNICATION NETWORK UPLINK

TECHNICAL FIELD

The present invention generally relates to wireless communication networks, and particularly relates to active queue management (AQM) in such networks.

BACKGROUND

LTE is a new radio access network technology evolved from 3G WCDMA providing high peak bit rates and good end-to-end QoS. Nevertheless, the wireless link is still likely to be the bottleneck of an end-to-end connection in many cases. In an overload situation, that is, a situation where the incoming data rate to the link is larger than the outgoing rate, the excessive data is temporarily stored in memory. This memory is often referred to as a transmit buffer or queue. If the overload continues, the data queue will accumulate and become large. This may cause a number of problems e.g., large end-to-end delays, unfair sharing between different flows etc.

Furthermore, because a buffer is finite, the queue might finally exceed the physical limitation, and some data has to be discarded. A straightforward way to handle this problem is discarding newly incoming data when the buffer is full. This approach is intuitive and easy to implement, however the performance is far from optimal in terms of end user delay.

A more sophisticated approach to managing buffer queues is referred to as Active Queue Management (AQM). AQM drops packets before the buffer is full. As a result, assuming IP packets are being sent over a TCP/IP link, the TCP sender can sense the segment loss and, as a consequence, reduce its sending rate—see Stevens, W. *TCP/IP Illustrated, Volume 1: The Protocols*. Addison-Wesley, 1994. In this way, the queue size and queuing time can be maintained at relatively low levels. Additionally, the throughput of the end-to-end link will not be reduced significantly.

Considerable work has been done for AQM. However, most AQM algorithms are designed for wired networks and are not suitable for mobile communication networks, because of their varying bandwidth characteristics, which result from varying radio conditions. Packet Discard Prevention Counter (PDPC) algorithm, on the other hand, is one AQM algorithm for WCDMA—see Sågfors, M. Ludwig, R. Meyer, M. Peisa, J. Buffer Management for Rate-Varying 3G Wireless Links Supporting TCP Traffic. In Proceedings of Vehicular Technology Conference, 2003. 3GPP also specified a simple algorithm called PDCP discard in its specification—see 3GPP TS 36.321. Evolved Universal Terrestrial Radio Access (E-UTRA); Medium Access Control (MAC) protocol specification, version 8.2.0. May 2008. Another AQM algorithm is proposed for 3GPP in 3GGP R2-080937, On the Need for Active Queue Management for non-GBR Bearers, TSG-RAN WG2 Meeting #60bis, February 2008. That proposal has not been accepted.

PDCP discard as specified for the UE in 3GPP Rel-8 is a simple delay-based algorithm which discards packets based on how long the packets have been in the PDCP queue. When the delay exceeds some predefined threshold, the packets will be discarded. This algorithm can maintain small end-to-end delay, but can result in considerable throughput degradation in some situations.

The more elaborate delay-based AQM algorithm proposed in the above-mentioned TSG-RAN meeting implements a mechanism to improve the throughput of PDCP discard, e.g., preventing consecutive packet drops, without introducing large end-to-end delay. However, as noted, the proposal was not accepted in 3GPP for LTE Rel-8. It would be possible to specify a UE based uplink AQM mechanism for LTE in Rel-9 (or later) to achieve a better performance but that would require standardization effort and the mechanism would not be available for Rel-8 UEs.

US2008/186918A1 relates to facilitated active queue management. The queue management can be effectuated in a serving radio base station as well as in the access terminal, and the application that generates the data packets can be executed locally or remotely to either the base station or the access terminal.

The 3GPP draft "SDU Discard", R2-074689, Nov. 12, 2007 discusses AQM as a mechanism that controls the size of the L2 data queue. AQM is defined as a sender side function used to maintain the queue sizes on the sender side at an acceptable level, where a decision to dro a sacket can be based on e.g. the size of the queue. It is proposed that an AQM mechanism should be specified for LTE, and that the queuing should be modeled in PDCP and the AQM mechanism should be located in the PDCP layer.

The 3GPP draft "Specifying SDU Discard function for the UE", R2-074703. Nov. 12, 2007 relates to the use of a SDU discard mechanism to realize an AQM mechanism as a sender side function for L TE UE to control the size of the queue on the sender side and corresponding queuing delays. AQM drops packets to force higher layer protocols to reduce their send rate, thereby leading to reduced queue size and reduced delays.

SUMMARY

A basic concept of the present invention is to implement the uplink active queue management (AQM) mechanism in the base station (e.g., in an eNodeB) instead of in the UE.

A corresponding challenge is that in the delay-based AQM algorithms mentioned above, the delay of each packet in the queue needs to be known. The delays of the UE buffers are basically known only in the UE side and there is not any standardized method to report them to the eNodeB. The teachings proposed herein allow for the eNodeB or other base station to gain knowledge of UE buffer delays.

In the context of LTE, the AQM algorithm for LTE uplink is implemented in eNodeB, which yields a number of advantages, including: the network has full control over the configuration of the algorithm; no standardization effort is needed (the solution is proprietary); and the mechanism works also for Rel-8 UEs (in contrast to a specified UE solution for Rel-9 or later).

In summary, according to the teachings presented for one or more embodiments herein, a network base station estimates the queuing delay of the transmit buffer in a UE, based on received buffer status reports from the UE and the amount of served data. The AQM algorithm in the base station, e.g., in an eNodeB, uses the estimated delay and the UE buffer size obtained from UE buffer status reports to decide when packets should be dropped in the base station to control the UE buffer. As a result, the TCP protocol will reduce its send rate in response to the packet drop and the queue size will be kept small.

BRIEF DESCRIPTION OF THE DRAWINGS

FIG. 3 is a pseudo code listing for one embodiment of a method of delay estimation for active queue management.

FIG. 6 is a logic flow diagram of one embodiment of a method, wherein a base station provides active queue management for user equipment.

FIG. 7 is a logic flow diagram of another embodiment of a method, wherein a base station provides active queue management for user equipment.

DETAILED DESCRIPTION OF SEVERAL EMBODIMENTS

Compared to a queue-size-based approach (e.g., PDPC), active queue management (AQM) can maintain both higher link utilization and lower end-to-end delay. Besides, AQM is less affected by bandwidth variations. Thus, in a new algorithm proposed in the present invention, the delay-based principle is retained. Advantageously, however, a base station, e.g., an eNodeB in an LTE network, provides delay-based queue management for a user equipment (UE), such as a mobile terminal.

To apply the principle in the eNodeB or other wireless communication network base station, the queuing delays of the packets in the UE buffer should be known by the eNodeB. However the UE queuing delay is not directly known in the eNodeB and needs to be estimated. A general description of a proposed AQM algorithm and the supporting delay estimation method for one or more embodiments of the present invention are disclosed below.

Delay-Based AQM in eNodeB

In LTE, Buffer Status Reports (BSRs) are transmitted from the UE to inform the eNodeB about the size of the queue in the buffer of the UE. BSRs are triggered by special events which are specified by 3GPP—see 3GPP TS 36.321. Evolved Universal Terrestrial Radio Access (E-UTRA); Medium Access Control (MAC) protocol specification, version 8.2.0. May 2008. Typically, the triggering interval is around tens of milliseconds. Thus, the BSR can be seen as a monitor of the queue length with a small time interval.

Figures 1, 2:
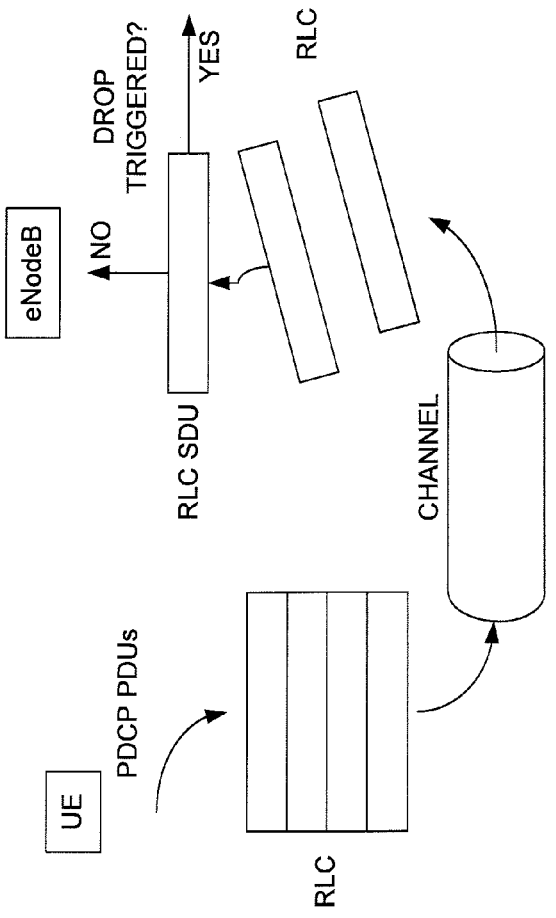
FIG. 1 is a pseudo code listing for one embodiment of a method of active queue management as contemplated herein.
FIG. 2 is a block diagram of one embodiment of a base station configured to provide active queue management for a user equipment (UE).

Assuming that the packet delay can be estimated in the eNodeB side based on BSRs and the amount of served data, a delay-based AQM algorithm can be implemented in eNodeB by using the estimated packet delay. FIG. 1 illustrates pseudo code for an algorithm in one embodiment of the proposed method of delay-based AQM in an eNodeB. The lowerDropThreshold, minAgeThreshold and minInterDropTime are three configurable parameters. Each time the eNodeB receives a BSR element, it firstly compares the BSR reported queue size with lowerDropThreshold; if the BSR reported size is smaller than lowerDropThreshold, no drop is allowed. Otherwise, the delay will be estimated by the method mentioned later. If the estimated delay is larger than minAgeThreshold, a packet will be discarded unless the time interval between the current time and the previous packet drop time is less than minInterDropTime.

One implementation of a new AQM algorithm as contemplated herein is illustrated in FIG. 2. The packets are discarded in the Radio Link Control (RLC) layer when the RLC SDUs are delivered to higher layers in the eNodeB. The implementation can also be done at the PDCP layer, in which case the discarded data units would be PDCP SDUs. Discarding data units at lower layers is not possible, because the RLC protocol in the eNodeB would ask for the retransmission of the discarded packet. As a result, the TCP sender could not detect the segment loss and thus would not reduce the sending rate.

It is also possible to use other information than the BSR to estimate the UE buffer size in the eNodeB. For example it has been discussed in 3GPP to introduce bits in the MAC header that carry information to aid the eNodeB scheduler (commonly known as "happy bits"). These bits could e.g., contain a short buffer status report or information about the queuing delay of the packets in the UE. If such bits are introduced in a later release of the 3GPP standard it is possible to use them instead of or in combination with the BSR to estimate the UE buffer size in the eNodeB.

It should be noted that, as an alternative to dropping packets in the AQM algorithm, it is also possible to "mark" the packets by setting the so-called ECN bits in the IP header (ECN=Explicit Congestion Notification). If the ECN bits are set, the TCP will also reduce the rate as a result. Thus, the approaches to AQM described in this document can be adapted to drop or mark packets.

Detailed Description of One Embodiment of a Method to Estimate Queuing Delay

In this subsection, an embodiment of the AQM method is provided to estimate the queuing delay of headmost data, i.e., oldest data, of an arbitrary buffer. It is assumed that the queue length can be monitored discontinuously, i.e., that one can know the queue length at discrete time intervals. It is also assumed that the amount of data served by the buffer during each time interval is available (either from the amount of data scheduled to be transmitted or from the amount of data received in the eNodeB). Also the length of the monitoring time interval is known and assumed to be small.

For convenience, the following text uses $t_i$ to denote the time when the queue is monitored, while the queue length at $t_i$ is denoted by $Q_i$. Additionally, the time interval between $t_{i-1}$ and $t_i$ is denoted by $\Delta t_i$, and the data served during time interval $\Delta t_i$ is denoted as $L_i$. Finally, let $R_i$ denote the amount of data arrived to the queue during the time interval. New data $R_i$ is not directly known but can be calculated from the queue length and outgoing bits, i.e., $$R_i = Q_i + L_i - Q_{i-1},$$

where $Q_i$, $L_i$, $Q_{i-1}$ are known variables.

At time n, the queuing delay of the oldest data in the queue, if one assumes that nothing is served during the monitoring interval, is $$\frac{\left( \sum_{i=r}^{n} \Delta t_i + \sum_{i=r-1}^{n} \Delta t_i \right)}{2},$$

where r is the index of monitoring event $t_r$ when the headmost data, i.e., the oldest data still existing in the queue, has arrived. However, during the monitored time interval, data corresponding to $L_n$ is already removed from the queue. Thus the actual headmost delay of headmost data is dependent upon the area in which the $Q_n$ is located. For instance, assume that the $Q_n$ is between $$\sum_{i=r+1}^{n} R_i \text{ and } \sum_{i=r}^{n} R_i,$$

then the max queuing delay is calculated as the average of their corresponding delays, i.e., $$D_n = \frac{\left(\sum_{i=r+1}^{n} \Delta t_i + \sum_{i=r}^{n} \Delta t_i\right)}{2}$$

The pseudo code of a detailed embodiment of a method to estimate (packet) delay is given FIG. 3. In the algorithm, the number of bits that are not served yet is saved together with the corresponding delays. The values are stored in data structures denoted by R☐ and D☐. When the current queue length, the amount of data served by the buffer, $L_i$, and time interval $\Delta t_i$, are received, then based on those values, amounts of served bits are removed from R☐ and the delays of all bits are updated.

Further Example Embodiments

Figure 4:
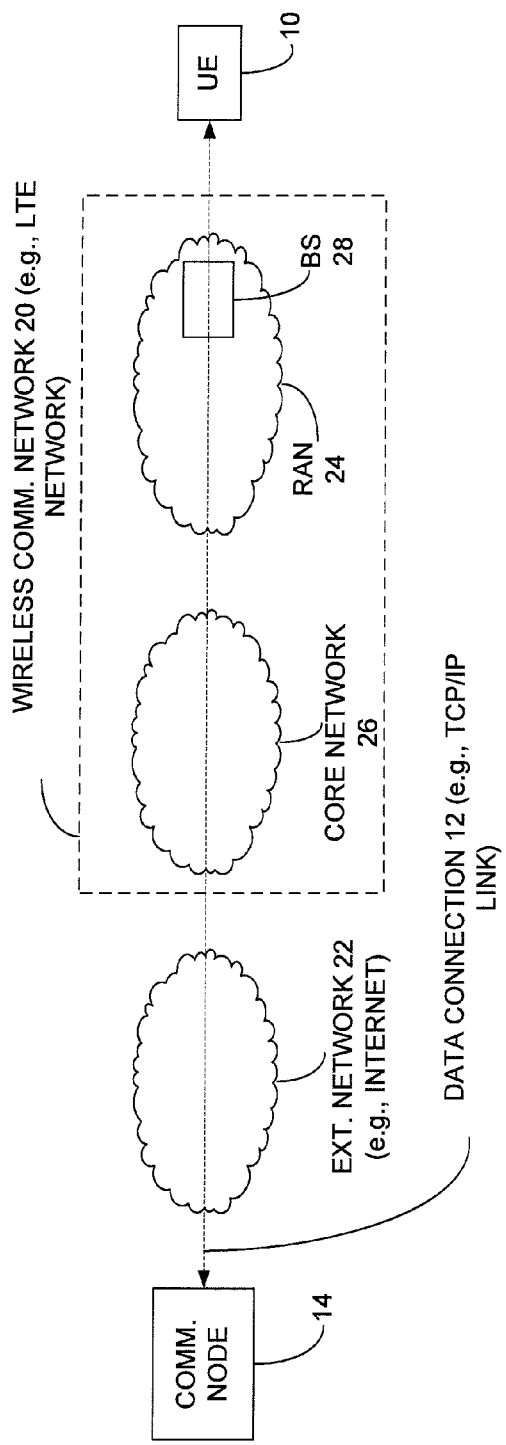
FIG. 4 is a block diagram of one embodiment of a wireless communication network, such as an LTE network, wherein an included base station provides active queue management for one or more mobile terminals or other user equipment.

FIG. 4 illustrates a UE 10, such as a cellular telephone or other mobile terminal having packet data connectivity capabilities. The UE 10 has a data connection 12 to a communication node 14, which may be another UE, or essentially any communication device, server, or other system capable of establishing an end-to-end data connection with the UE 10. In the illustration, the data connection 12 may be a TCP/IP communication link.

More particularly, a wireless communication network 20, such as an LTE network, supports the data connection 12 between the UE 10 and the communication node 14, by communicatively linking the UE 10 to one or more external data networks 22, such as the Internet. Of course, the same type of data connection can be supported by the network 20 for UEs operating within the network 20, and active queue management in base stations, as regards UEs, can be performed for data connections made inside and outside of the network 20.

In more detail, the network 20 includes a Radio Access Network (RAN) 24, which communicatively links to a Core Network (CN) 26, which in turn communicatively couples to the external network(s) 22. The RAN 24 includes a number of base stations 28, where one is shown for simplicity. The base station 28, which may be an eNodeB in an LTE embodiment of the network 20, advantageously includes one or more processing circuits which are configured to provide active queue management for transmit buffers in any number of UEs 10 having data connections 12 established through the base station 28.

Thus, with a TCP/IP link established between the UE 10 and the communication node 14 through the base station 28, the base station 28 can trigger TCP-based flow control for uplink transmissions from the UE 10, based on selectively dropping or marking uplink (IP) packets sent from the UE 10 toward the communication node 14. That is, loss (or congestion marking) of IP packets flowing on the uplink will cause the TCP to reduce the UE's packet sending rates and thereby relieve congestion.

Figure 5:
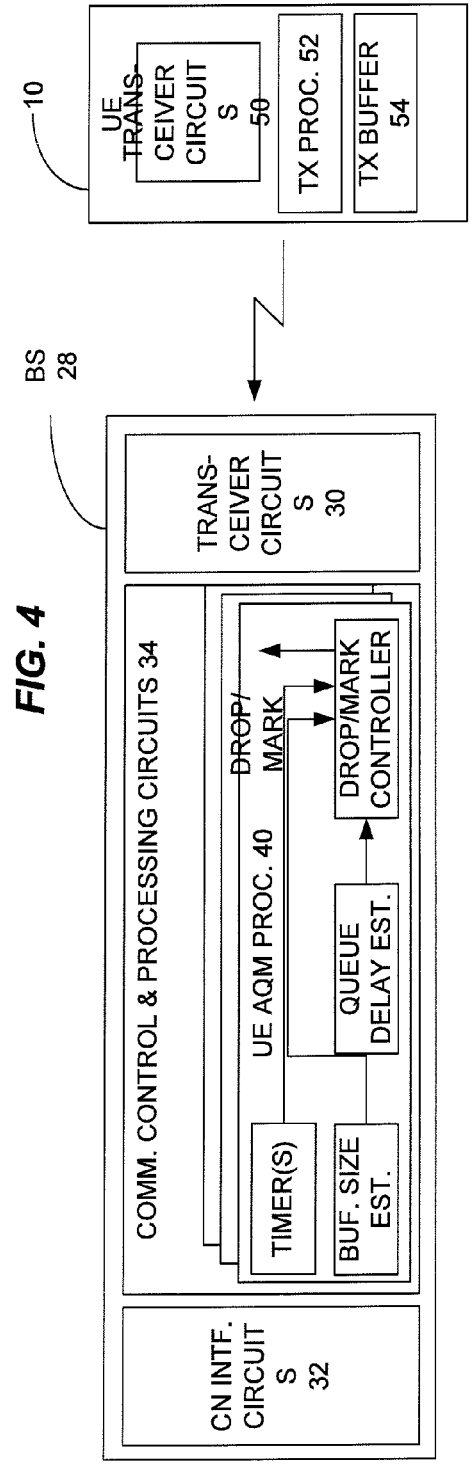
FIG. 5 is a block diagram of one embodiment of a base station, e.g., an eNodeB, that is configured with one or more processors implementing active queue management for user equipment.

FIG. 5 illustrates a non-limiting example embodiment of the base station 28. The illustrated base station 28 includes transceiver circuits 30 for downlink and uplink signalling to and from a potentially large number of UEs 10. The base station 28 further includes CN interface circuits 32, for communicatively coupling to the CN 26. Still further, the base station 28 includes a number of communication control and processing circuits 34, which may comprise a collection of rack/sub-rack processing cards or other processing subsystems.

Regardless of the particular physical implementation, the base station 28 further includes an active queue management (AQM) processor 40, to implement active queue management of transmit buffers in one or more UEs 10. (The circuitry may be configured to provide AQM for multiple UEs 10, or parallel implementations of the circuitry may be used to provide AQM for multiple UEs 10.) Regarding such flexibility, it will be appreciated that the processing circuits 34 in one or more embodiments include one or more microprocessor and/or digital signal processor circuits, along with associated program and data memory. As such, the illustrated circuits may represent functional circuit implementations realized at least in part through the execution of computer program instructions stored in a computer readable medium within the base station 28.

In the example implementation of the AQM processor 40, a drop/mark controller selectively determines whether to drop (or mark) packets from the UE, based on evaluating at least one of an estimated transmit buffer size for the UE 10 and an estimated queuing delay for packets in the UE transmit buffer. Supporting such functionality, the AQM processor 40 includes or is associated with one or more timers, a transmit buffer size estimator, and a queuing delay estimator, and it will be appreciated that working data and program memory may be included in or associated with these circuits.

For further reference, an example embodiment of the UE 10 is shown, including transceiver circuits 50, transmit processor 52, and transmit buffer 54. For the illustrated example, then, the AQM processor 40 in the base station 28 will thus be understood as providing AQM for the transmit buffer 54 in the UE 10.

With the supporting functional processing shown in FIG. 5, it will be appreciated that one embodiment of a method disclosed herein comprises a method in a base station of managing a transmission queue in a user equipment transmitting packets to the base station. As shown in the example embodiment of FIG. 6, the method includes estimating at least one of a transmit buffer size and a transmit buffer queuing delay for the user equipment (Block 100), and selectively dropping or congestion-marking packets received at the base station from the user equipment, based on at least one of the estimated transmit buffer size and the estimated transmit buffer queuing delay (Block 102).

The packets in one or more embodiments are Internet Protocol (IP) packets sent by the user equipment on a Transmit Control Protocol (TCP)/IP data connection. As such, selectively dropping or congestion-marking packets received at the base station from the user equipment comprises selectively dropping or congestion marking the IP packets to trigger TCP-based flow control on the data connection.

In one or more embodiments, selectively dropping or congestion-marking the packets comprises selectively dropping packets at the Radio Link Control (RLC) Layer, or at the Packet Data Convergence Protocol (PDCP) layer, to avoid triggering RLC or PDCP based packet retransmission by the user equipment of the dropped packets.

Further, as detailed earlier herein, selectively dropping or congestion-marking packets received at the base station from the user equipment comprises selectively dropping or congestion-marking packets received from the user equipment if the estimated transmit buffer size exceeds a defined buffer size threshold. In one or more embodiments, estimating the transmit buffer queue size of the user equipment is based on receiving buffer status reports or buffer status indicators from the user equipment. Similarly, estimating the transmit buffer queuing delay also may be based on the buffer status reports or buffer status indicators, and an amount of served data as calculated from an amount of uplink data transmitted, or scheduled for transmission, from the user equipment to the base station.

In at least one embodiment, estimating the transmit buffer queuing delay comprises calculating the amount of data not yet served from the transmit buffer of the user equipment, based on the buffer status reports or buffer status indicators, and an amount of served or scheduled data, and storing and updating this data amount with corresponding delay in a data structure maintained at the base station. Here, the estimated transmit buffer queuing delay may be calculated as the delay of the oldest entry in the data structure.

In another embodiment, selectively dropping or congestion-marking packets received at the base station from the user equipment comprises selectively dropping or congestion-marking packets received from the user equipment if the estimated transmit buffer size exceeds a defined buffer size threshold, and if the estimated transmit buffer queuing delay exceeds a defined queuing delay threshold. More particularly, the method may comprise not dropping or congestion-marking packets if the estimated transmit buffer size is below a defined size threshold.

Building on this approach, the method may further include, if the estimated transmit buffer size is above the defined size threshold, selectively dropping or congestion-marking packets received at the base station from the user equipment further based on checking if the estimated transmit buffer queuing delay is greater than a defined delay threshold. If so, the method drops or congestion-marks a current received packet, unless the time interval from a last packet dropping or marking event is less than a defined time threshold.

FIG. 7 illustrates the method embodiment described immediately above. According to the illustrated processing logic, which may be implemented for a given packet by the AQM processor 40 of FIG. 5, the estimated transmit buffer size of the UE, denoted as EBS, is compared to a defined buffer size threshold, denoted as TH(S) (Block 110). If the estimated transmit buffer size is below the defined size threshold (Block 112, EBS not greater than TH(S)), the given packet is not dropped or otherwise marked (Block 114).

However, if the buffer size threshold is exceeded, processing continues with comparing the estimated transmit buffer queuing delay of the UE, denoted as EQD, to a defined delay threshold, denoted as TH(D) (Blocks 116 and 118). If the estimated queuing delay does not exceed the defined delay threshold, the given packet is not dropped/marked (Block 120). However, if the queuing delay threshold is exceeded, the given packet can be dropped/marked at that point, or, in at least one embodiment, a further check is performed.

As shown in the illustration, the further check may be determining whether the time interval since the last dropping/marking event exceeds a defined interval timer (INT.>TMR?) (Blocks 122 and 124). If less than the defined timer duration has elapsed since the last drop/mark event, the given packet is not dropped or otherwise marked (Block 126). If the minimum elapsed time has expired, dropping (or marking) is performed (Block 128).

This elapsed time check prevents too many packets from being dropped or otherwise congestion-marked, and prevents dropping/marking consecutive packets. Of course, the timer used to space dropping/marking events can be updated or changed dynamically, based on a performance monitoring or other metric associated with the data link, as can the other defined thresholds used for AQM.

Non-Limiting Advantages of the Invention

The solution proposed by the present invention has, but is not limited to, the following characteristics: (1) it is implemented in the network (e.g., in the base station) rather than in the UE, thus enabling better control of the UE's buffer from the network side; (2) no standardization effort is required (proprietary solution); (3) the solution works also for existing Rel-8 UEs which would not be the case for a standardized UE solution in Rel-9 or later; (4) it maintains a small packet end-to-end delay without significant impact on the throughput.

In one or more embodiments, the present invention comprises a mechanism in uplink to selectively drop (or mark) received packets in a base station to improve TCP performance. In at least one embodiment, the dropping (or marking) criteria is based on the estimated UE buffer size and optionally on the estimated UE buffer delay.

The UE buffer size is estimated from received UE buffer status reports, for example, and the UE buffer delay is estimated based on received buffer reports and the amount of served data, for example. In support of this estimation, the amount of served data is calculated from the amount of scheduled uplink data, or the amount of received data in the base station (eNodeB).

Abbreviations

The following abbreviations are used:
AQM: Active Queue Management;
ARQ: Automatic Repeat request;
BSR: Buffer Status Report;
eNodeB: evolved Node B;
LTE: Long-Term Evolution;
PDCP: Packet Data Convergence Protocol;
PDCP: Packet Discard Prevention Counter;
PDU: Protocol Data Unit;
QoS: Quality of Service;
RLC: Radio Link Control; and
SDU: Service Data Unit.

Those skilled in the art will appreciate that the present invention is not limited by the foregoing examples and illustrations, but rather is limited only by the following appended claims and their legal equivalents.

What is claimed is:

1. A method implemented by a base station for active queue management of a transmit buffer in a user equipment transmitting packets to the base station, comprising:
estimating, by the base station, a size of the transmit buffer by calculating the amount of data not yet served from the transmit buffer of the user equipment, based on buffer status reports or buffer status indicators received from the user equipment, and an amount of served or scheduled data;
estimating, by the base station, a queuing delay for the transmit buffer in the user equipment by storing and updating the calculated amount of data not yet served with corresponding delay in a data structure maintained at the base station; and selectively dropping or congestion-marking, by the base station, packets received at the base station from the user equipment, based on the estimated size of the transmit buffer and the estimated queuing delay for the transmit buffer in the user equipment.

2. The method of claim 1, wherein the packets are Internet Protocol (IP) packets sent by the user equipment on a Transmit Control Protocol (TCP)/IP data connection, and wherein selectively dropping or congestion-marking packets received at the base station from the user equipment comprises selectively dropping or congestion marking the IP packets to trigger TCP-based flow control on the data connection.

3. The method of claim 1, wherein selectively dropping or congestion-marking the packets comprises selectively dropping packets at a Radio Link Control (RLC) Layer, or at a Packet Data Convergence Protocol (PDCP) layer, to avoid triggering RLC or PDCP based packet retransmission by the user equipment of the dropped packets.

4. The method of claim 1, wherein selectively dropping or congestion-marking packets received at the base station from the user equipment comprises selectively dropping or congestion-marking packets received from the user equipment if the estimated size of the transmit buffer exceeds a defined buffer size threshold.

5. The method of claim 1, wherein selectively dropping or congestion-marking packets received at the base station from the user equipment comprises selectively dropping or congestion-marking packets received from the user equipment if the estimated size of the transmit buffer exceeds a defined buffer size threshold, and if the estimated queuing delay for the transmit buffer exceeds a defined queuing delay threshold.

6. The method of claim 1, wherein estimating the queuing delay for the transmit buffer is based on an amount of uplink data transmitted, or scheduled for transmission, from the user equipment to the base station.

7. The method of claim 1, wherein selectively dropping or congestion-marking packets received at the base station from the user equipment comprises not dropping or congestion-marking packets if the estimated size of the transmit buffer is below a defined size threshold.

8. The method of claim 7, wherein, if the estimated size of the transmit buffer is above the defined size threshold, selectively dropping or congestion-marking packets received at the base station from the user equipment further comprises checking if the estimated queuing delay for the transmit buffer is greater than a defined delay threshold, and, if so, dropping or congestion-marking a current received packet, unless the time interval from a last packet dropping or marking event is less than a defined time threshold.

9. The method of claim 1, wherein calculating the estimated queuing delay for the transmit buffer comprises calculating the estimated queuing delay for the transmit buffer as a delay of the oldest entry in the data structure.

10. A base station comprising one or more processing circuits configured for active queue management of a transmit buffer in a user equipment transmitting packets to the base station, the one or more processing circuits configured to:

estimate, at the base station, a size of the transmit buffer by calculating the amount of data not yet served from the transmit buffer of the user equipment, based on buffer status reports or buffer status indicators received from the user equipment, and an amount of served or scheduled data;

estimate, at the base station, a queuing delay for the transmit buffer in the user equipment by storing and updating the calculated amount of data not yet served with corresponding delay in a data structure maintained at the base station; and selectively drop or congestion-mark, at the base station, packets received at the base station from the user equipment, based on the estimated size of the transmit buffer and the estimated queuing delay for the transmit buffer in the user equipment.

11. The base station of claim 10, wherein the packets are Internet Protocol (IP) packets sent by the user equipment on a Transmit Control Protocol (TCP)/IP data connection, and wherein the one or more processing circuits are configured to selectively drop or congestion-mark packets received at the base station from the user equipment by selectively dropping or congestion marking the IP packets to trigger TCP-based flow control on the data connection.

12. The base station of claim 10, wherein the one or more processing circuits are configured to selectively drop or congestion-mark the packets by selectively dropping packets at a Radio Link Control (RLC) Layer, or at a Packet Data Convergence Protocol (PDCP) layer, to avoid triggering RLC or PDCP based packet retransmission by the user equipment of the dropped packets.

13. The base station of claim 10, wherein the one or more processing circuits are configured to selectively drop or congestion-mark packets received at the base station from the user equipment by selectively dropping or congestion-marking packets received from the user equipment if the estimated size of the transmit buffer exceeds a defined buffer size threshold.

14. The base station of claim 10, wherein the one or more processing circuits are configured to selectively drop or congestion-mark packets received at the base station from the user equipment by selectively dropping or congestion-marking packets received from the user equipment if the estimated size of the transmit buffer exceeds a defined buffer size threshold, and if the estimated queuing delay for the transmit buffer exceeds a defined queuing delay threshold.

15. The base station of claim 10, wherein the one or more processing circuits are configured to estimate the queuing delay for the transmit buffer based on an amount of uplink data transmitted, or scheduled for transmission, from the user equipment to the base station.

16. The base station of claim 10, wherein the one or more processing circuits are configured to selectively drop or congestion-mark packets received at the base station from the user equipment by not dropping or congestion-marking packets if the estimated size of the transmit buffer is below a defined size threshold.

17. The base station of claim 16, wherein, if the estimated size of the transmit buffer is above the defined size threshold, the one or more processing circuits are configured to selectively drop or congestion-mark packets received at the base station from the user equipment further by checking if the estimated queuing delay for the transmit buffer is greater than a defined delay threshold, and, if so, dropping or congestion-marking a current received packet, unless the time interval from a last packet dropping or marking event is less than a defined time threshold.

18. The base station of claim 10, wherein the one or more processing circuits are configured to calculate the estimated queuing delay for the transmit buffer as a delay of the oldest entry in the data structure.

* * * * *